US012244670B2

(12) United States Patent
Liss et al.

(10) Patent No.: US 12,244,670 B2
(45) Date of Patent: *Mar. 4, 2025

(54) SESSION-BASED REMOTE DIRECT MEMORY ACCESS

(71) Applicant: Mellanox Technologies, Ltd., Yokneam (IL)

(72) Inventors: Liran Liss, Atzmon-Segev (IL); Yamin Friedman, Jerusalem (IL); Michael Kagan, Zichron Yaakov (IL); Diego Crupnicoff, Buenos Aires (AR); Idan Burstein, Akko (IL); Matty Kadosh, Hadera (IL); Tzah Oved, Ramat Gan (IL); Dror Goldenberg, Zichron Yaakov (IL); Ron Yuval Efraim, Tzur Hadassah (IL); Alexander Eli Rosenbaum, Elishama (IL); Aviad Yehezkel, Yokneam Ilit (IL); Rabia Loulou, Nazareth (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,005

(22) Filed: Aug. 1, 2023

(65) Prior Publication Data
US 2023/0379390 A1 Nov. 23, 2023

Related U.S. Application Data

(63) Continuation of application No. 17/724,540, filed on Apr. 20, 2022, now Pat. No. 11,765,237.

(51) Int. Cl.
*H04L 67/141* (2022.01)
*G06F 15/173* (2006.01)
(Continued)

(52) U.S. Cl.
CPC ...... *H04L 67/141* (2013.01); *G06F 15/17331* (2013.01); *H04L 9/0825* (2013.01); *H04L 67/146* (2013.01); *H04L 69/161* (2013.01)

(58) Field of Classification Search
None
See application file for complete search history.

(56) References Cited

U.S. PATENT DOCUMENTS 7,046,668 B2   5/2006  Pettey et al.
7,152,122 B2   12/2006 Kagan et al.
(Continued)

FOREIGN PATENT DOCUMENTS

EP    3719657 A1    6/2017
EP    3654563 A1    5/2020
(Continued)

OTHER PUBLICATIONS

Feng et al., "Accelerating Distributed Deep Learning using Multi-Path RDMA in Data Center Networks," ACM SIGCOMM Symposium on SDN Research—SOSR '21, Association for Computing Machinery, pp. 1-13, year 2021.

*Primary Examiner* — Younes Naji
(74) *Attorney, Agent, or Firm* — Meitar Patents Ltd.; Daniel Kligler

(57) ABSTRACT

Apparatus for data communication includes a network interface for connection to a packet data network and a host interface for connection to a host computer, which includes a central processing unit (CPU) and a host memory. Packet processing circuitry receives, via the host interface, from a kernel running on the CPU, associations between multiple remote direct memory access (RDMA) sessions and multiple different User Datagram Protocol (UDP) 5-tuple, which are assigned respectively to the RDMA sessions, and receives from an application running on the CPU a request to send an RDMA message, using a selected group of one or (Continued)

more of the RDMA sessions, to a peer application over the packet data network, and in response to the request, transmits, via the network interface, one or more data packets using a UDP 5-tuple that is assigned to one of the RDMA sessions in the selected group.

20 Claims, 6 Drawing Sheets

(51) Int. Cl.
*H04L 9/08* (2006.01)
*H04L 67/146* (2022.01)
*H04L 69/16* (2022.01)

(56) References Cited

U.S. PATENT DOCUMENTS

| | | | |
|---|---|---|---|
| 7,457,906 | B2 | 11/2008 | Pettey et al. |
| 7,620,066 | B2 | 11/2009 | Pettey et al. |
| 8,811,417 | B2 | 8/2014 | Bloch et al. |
| 8,982,703 | B2 | 3/2015 | Almog et al. |
| 9,143,467 | B2 | 9/2015 | Kagan et al. |
| 9,696,942 | B2 | 7/2017 | Kagan et al. |
| 9,727,503 | B2 | 8/2017 | Kagan et al. |
| 9,787,590 | B2 | 10/2017 | Sivan et al. |
| 9,925,492 | B2 | 3/2018 | Raikin et al. |
| 10,152,441 | B2 | 12/2018 | Liss et al. |
| 10,275,375 | B2 | 4/2019 | Ayoub |
| 10,284,383 | B2 | 5/2019 | Bloch et al. |
| 10,387,358 | B2 | 8/2019 | Oved |
| 10,430,374 | B2 | 10/2019 | Menachem et al. |
| 10,496,595 | B2 | 12/2019 | Degani et al. |
| 10,505,677 | B2 | 12/2019 | Shpiner et al. |
| 10,594,617 | B2 | 3/2020 | Shpiner et al. |
| 10,642,775 | B1 | 5/2020 | Voks et al. |
| 10,999,364 | B1 | 5/2021 | Itigin et al. |
| 11,005,770 | B2 | 5/2021 | Gafni et al. |
| 11,088,966 | B2 | 8/2021 | Menachem et al. |
| 11,115,339 | B2 * | 9/2021 | Shen .................. H04L 47/26 |
| 11,218,413 | B2 | 1/2022 | Shpigelman et al. |
| 11,296,988 | B2 | 4/2022 | Shpigelman et al. |
| 11,308,024 | B2 * | 4/2022 | Chen .................. G06F 15/17331 |
| 11,336,581 | B2 * | 5/2022 | Borikar .................. H04L 69/22 |
| 2006/0031524 | A1 * | 2/2006 | Freimuth .............. H04L 69/166 709/227 |
| 2013/0159568 | A1 * | 6/2013 | Shahar .................. H04L 49/901 710/54 |
| 2016/0065659 | A1 | 3/2016 | Bloch et al. |
| 2016/0188527 | A1 * | 6/2016 | Cherian .................. H04L 41/12 709/212 |
| 2017/0255590 | A1 | 9/2017 | Shuler et al. |
| 2018/0026878 | A1 | 1/2018 | Zahavi et al. |
| 2018/0052803 | A1 | 2/2018 | Graham et al. |
| 2018/0267919 | A1 | 9/2018 | Burstein |
| 2019/0028505 | A1 | 1/2019 | Shpiner et al. |
| 2019/0171612 | A1 | 6/2019 | Shahar et al. |
| 2019/0173810 | A1 | 6/2019 | Shpiner et al. |
| 2019/0327173 | A1 | 10/2019 | Gafni et al. |
| 2020/0084150 | A1 | 3/2020 | Burstein et al. |
| 2020/0089816 | A1 | 3/2020 | Shattah |
| 2020/0099620 | A1 * | 3/2020 | Shen .................. H04L 61/2517 |
| 2020/0106828 | A1 | 4/2020 | Elias et al. |
| 2020/0153739 | A1 | 5/2020 | Gafni et al. |
| 2020/0371708 | A1 | 11/2020 | Karmani et al. |
| 2020/0374230 | A1 | 11/2020 | Aibester et al. |
| 2021/0083981 | A1 * | 3/2021 | Shmilovici .............. H04L 45/74 |
| 2021/0117246 | A1 * | 4/2021 | Lal .............................. G06T 1/20 |
| 2021/0168354 | A1 | 6/2021 | Levi et al. |
| 2021/0243155 | A1 * | 8/2021 | Anderson ............. H04L 61/255 |
| 2021/0306166 | A1 | 9/2021 | Piasetzky et al. |
| 2021/0344782 | A1 | 11/2021 | Shpigelman et al. |
| 2022/0060417 | A1 | 2/2022 | Kfir et al. |
| 2022/0078043 | A1 | 3/2022 | Marcovitch et al. |
| 2022/0158772 | A1 | 5/2022 | Burstein et al. |
| 2022/0174000 | A1 | 6/2022 | Mendelson et al. |
| 2022/0188147 | A1 | 6/2022 | Nudelman et al. |

FOREIGN PATENT DOCUMENTS

| | | |
|---|---|---|
| EP | 3952254 A1 | 2/2022 |
| EP | 4002734 A1 | 5/2022 |
| TW | 486633 B | 5/2002 |

* cited by examiner

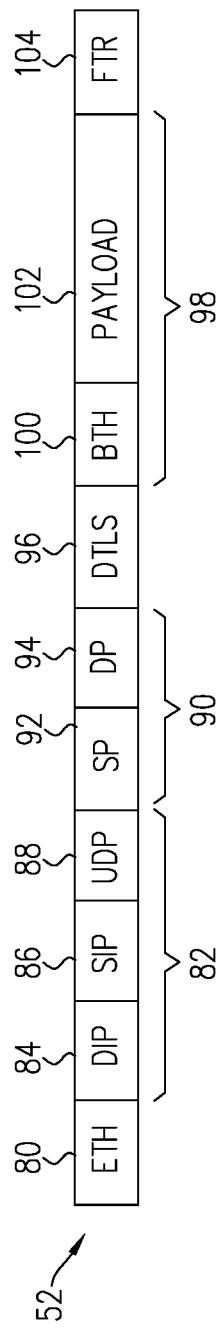
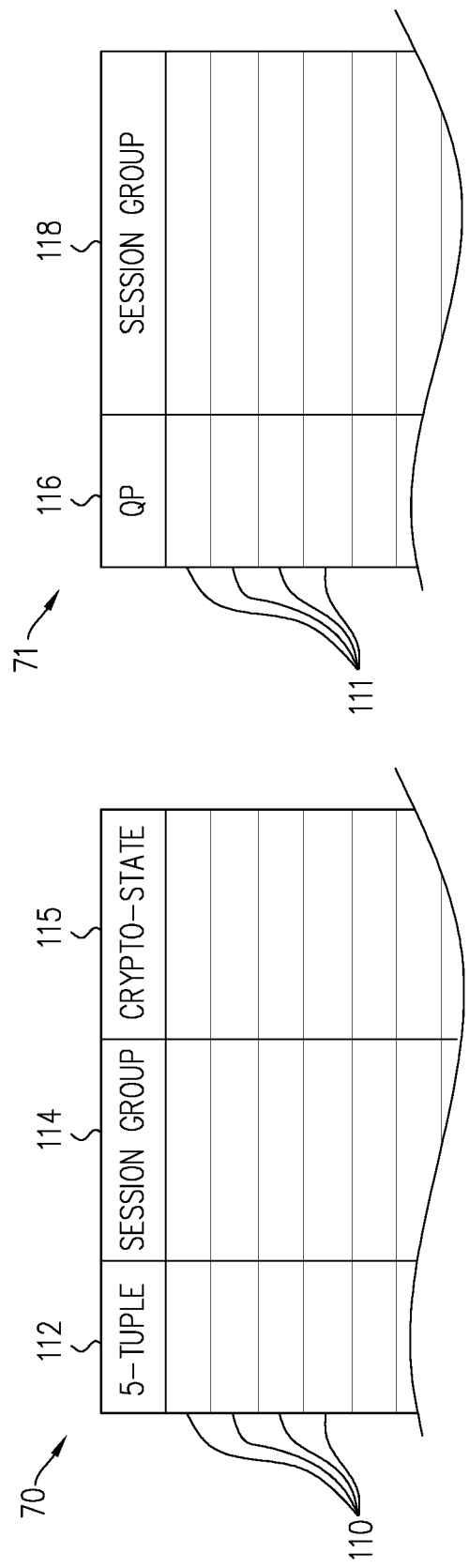

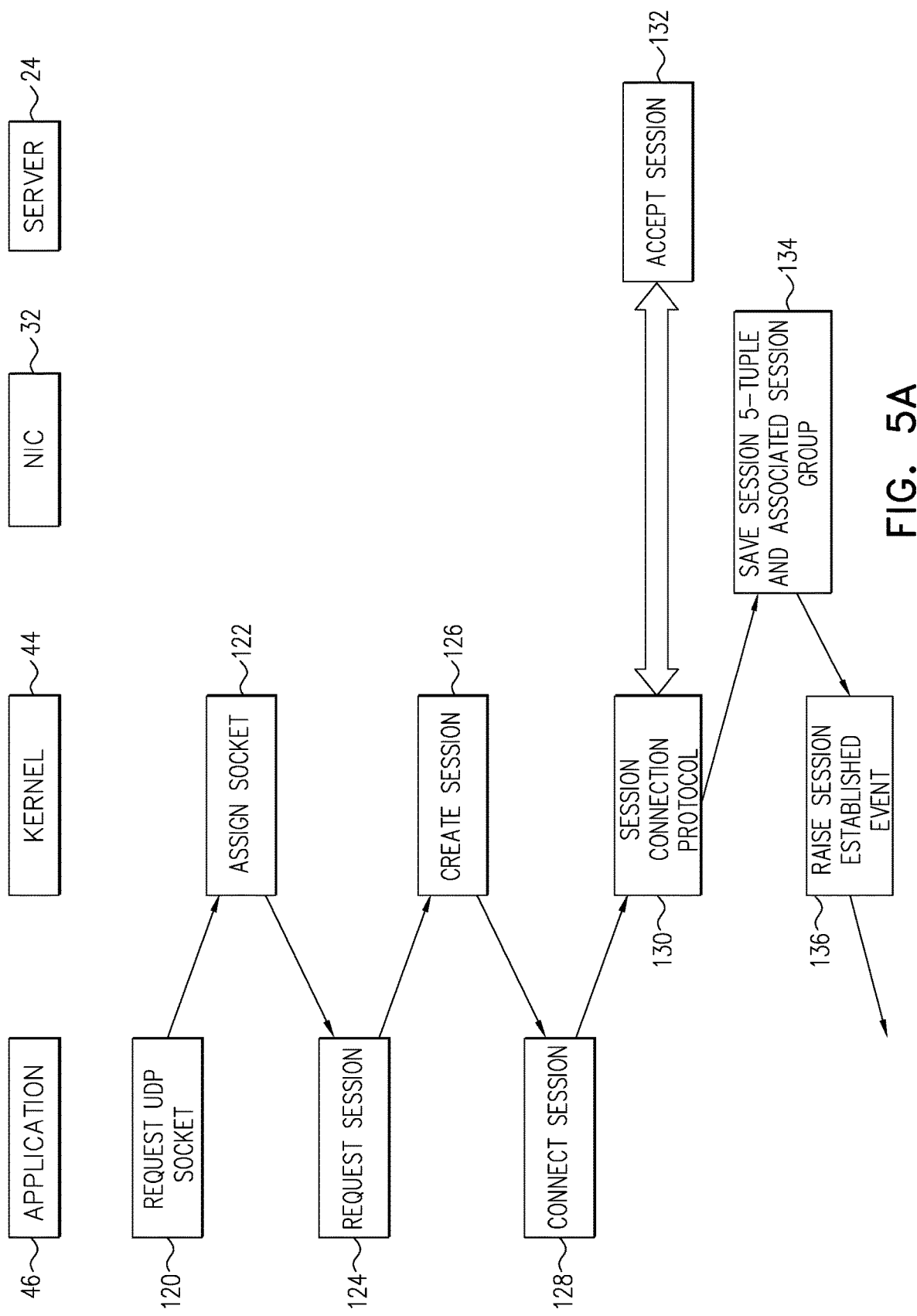

SESSION-BASED REMOTE DIRECT MEMORY ACCESS

CROSS-REFERENCE TO RELATED APPLICATION

This application is a continuation of U.S. patent application Ser. No. 17/724,540, filed Apr. 20, 2022, which is incorporated herein by reference.

FIELD OF THE INVENTION

The present invention relates generally to packet data communications, and particularly to systems and methods for remote direct memory access (RDMA).

BACKGROUND

Data packets that are transmitted in accordance with the Internet Protocol (IP) have packet headers that contain a destination IP address, destination port, source IP address, source port, and protocol number (among other fields). The values of these five fields are collectively referred to as the "IP 5-tuple." This 5-tuple is commonly used to identify packets and packet flows for purposes of routing and other network services. The protocol number identifies the next-level protocol used in the IP packet payload. For example, the User Datagram Protocol (UDP) is identified by protocol number 17. In the present description and in the claims, an IP 5-tuple in which the next-level protocol is UDP is also referred to as a UDP 5-tuple.

RDMA over Converged Ethernet (RoCE) is a network protocol that allows remote direct memory access (RDMA) over an Ethernet network. RoCE v1 is an Ethernet link-layer protocol, which allows communication between any two hosts in the same Ethernet broadcast domain. RoCE v2 is an internet-layer protocol, which enables RoCE packets to be routed. The RoCE v2 protocol runs over UDP, i.e., the RoCE v2 header and payload are encapsulated in a UDP/IP packet, using destination port number 4791 in the IP header.

SUMMARY

Embodiments of the present invention that are described hereinbelow provide improved methods for RDMA communications, as well as devices, systems and software that implement such methods.

There is therefore provided, in accordance with an embodiment of the invention, apparatus for data communication, including a network interface for connection to a packet data network and a host interface for connection to a host computer, which includes a central processing unit (CPU) and a host memory. Packet processing circuitry receives, via the host interface, from a kernel running on the CPU, associations between multiple remote direct memory access (RDMA) sessions and multiple different User Datagram Protocol (UDP) 5-tuple, which are assigned respectively to the RDMA sessions, and receives from an application running on the CPU a request to send an RDMA message, using a selected group of one or more of the RDMA sessions, to a peer application over the packet data network, and in response to the request, transmits, via the network interface, one or more data packets using a UDP 5-tuple that is assigned to the one of the RDMA sessions in the selected group.

In some embodiments, the packet processing circuitry transmits the one or more data packets by encapsulating an RDMA payload in an Internet Protocol (IP) packet having an IP header containing a selected one of the UDP 5-tuples. In a disclosed embodiment, the multiple, different UDP 5-tuples that are respectively assigned to the RDMA sessions include different, respective UDP source ports.

Additionally or alternatively, upon receiving an incoming IP packet from the packet data network, the packet processing circuitry identifies the UDP 5-tuple in a header of the incoming IP packet, recognizes an RDMA session to which the UDP 5-tuple is assigned, and based on the recognized session, decapsulates and delivers the RDMA payload of the incoming packet to the application. In a disclosed embodiment, the kernel assigns different ones of the RDMA sessions to work queues associated with different, respective applications running on the CPU, and the packet processing circuitry delivers the RDMA payload to the application only after verifying that the recognized session is assigned to a work queue that is assigned to the application.

In some embodiments, in response to instructions conveyed by the kernel, the packet processing circuitry stores assignments of different ones of the RDMA sessions to different, respective applications running on the CPU. In one embodiment, the packet processing circuitry stores an assignment of a group of two or more of the RDMA sessions to a single one of the applications. Additionally or alternatively, the application enters the request to send the RDMA message in a work queue that is assigned to the application, and the work queue is bound by the kernel to an RDMA session that is assigned to the application, and the packet processing circuitry stores records of the sessions and the work queues that are respectively bound to the sessions, and applies the records in validating RDMA messages from and to the application.

In a disclosed embodiment, the packet processing circuitry stores respective cryptographic keys for one or more of the RDMA sessions, and applies the respective cryptographic keys in encrypting and decrypting RDMA payloads of the data packets that are transmitted to and received from the packet data network in the one or more of the RDMA sessions.

There is also provided, in accordance with an embodiment of the invention, a method for data communication, which includes coupling a network interface controller (NIC) between a packet data network and a host computer, which includes a central processing unit (CPU) and a host memory. The NIC receives, from a kernel running on the CPU, a definition of multiple remote direct memory access (RDMA) sessions and multiple different User Datagram Protocol (UDP) 5-tuples assigned respectively to the RDMA sessions. The NIC receives, from an application running on the CPU, a request to send an RDMA message, using a selected group of one or more of the RDMA sessions, to a peer application over the packet data network. In response to the request, the NIC transmits, via the packet data network, one or more data packets using a UDP 5-tuple that is assigned to the one of the RDMA sessions in the selected group.

There is additionally provided, in accordance with an embodiment of the invention, a system for data communication, including a host memory and a central processing unit (CPU), which runs a kernel, which defines multiple remote direct memory access (RDMA) sessions and assigns multiple different User Datagram Protocol (UDP) 5-tuples respectively to the RDMA sessions, and an application, which generates a request to send an RDMA message, using a selected group of one or more of the RDMA sessions, to a peer application over a packet data network. A network interface controller (NIC) transmits, in response to the request, via the packet data network, one or more data packets using a UDP 5-tuple that is assigned to the one of the RDMA sessions in the selected group.

The present invention will be more fully understood from the following detailed description of the embodiments thereof, taken together with the drawings in which:

BRIEF DESCRIPTION OF THE DRAWINGS

FIG. 3 is a block diagram that schematically illustrates the structure of an RDMA data packet, in accordance with an embodiment of the invention;

FIGS. 4A and 4B are block diagrams that schematically illustrates tables used by a NIC in processing data packets, in accordance with an embodiment of the invention;

FIGS. 5A and 5B are a flow chart that schematically illustrates a method for setting up an RDMA session, in accordance with an embodiment of the invention.

DETAILED DESCRIPTION OF EMBODIMENTS

Overview

Figure 1:
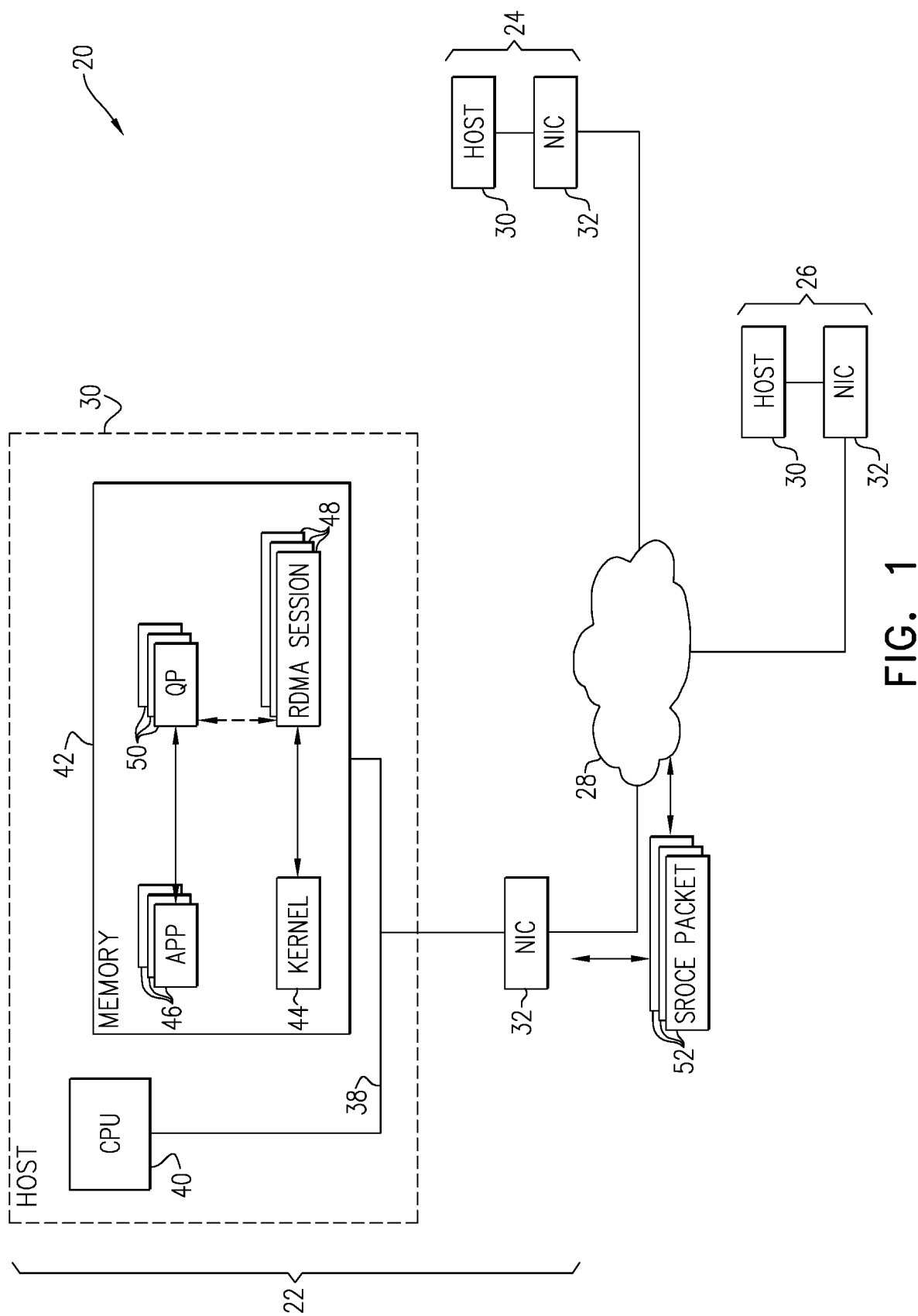
FIG. 1 is a block diagram that schematically illustrates a data network communication system, in accordance with an embodiment of the invention.

As noted earlier, the RoCE v2 protocol uses UDP/IP packets with destination port number 4791. The use of a fixed port number makes it easy for a network interface controller (NIC) and other network elements to implement the protocol and to recognize RoCE traffic. Many network services, however, such as network address translation (NAT), firewalls, and multipath routing, rely on being able to change the values of fields in the IP packet header, including the destination port number. Limiting RoCE traffic to a fixed destination port means that these services cannot be applied to RoCE packets.

Embodiments of the present invention that are described herein provide a new session-based protocol for transmission of RDMA messages over UDP/IP, which overcomes these limitations. The protocol is referred to herein as session-based RoCE, or SRoCE. Each session is identified at the RDMA endpoints by a unique IP 5-tuple. Typically, at any given network endpoint, different SROCE sessions will have different source port numbers. Therefore, when a network endpoint receives an SRoCE packet, it is able to respond simply by reversing the 5-tuple (i.e., exchanging the values of the destination and source IP addresses and the values of the destination and source ports), without having to preserve the pre-assigned destination port number as in RoCE v2. Network endpoints and intermediate nodes are able to handle the packets like any other UDP/IP packets and can apply NAT, firewalls, routing algorithms and other functions to the packets as they would to any other UDP/IP packet flow.

In the disclosed embodiments, SRoCE sessions are set up by trusted software running on a host computer, such as the operating system kernel. The kernel assigns sessions, upon request, to work queues of user applications seeking to set up RDMA communications over the network with peer applications running on other network nodes. The kernel registers the sessions and the work queues to which they are assigned with the NIC of the host computer. Thus, the NIC is able to recognize SRoCE sessions based on the packet 5-tuples and to ensure that SRoCE packets can be transmitted and received in any given session only by the application work queue to which the session is assigned. In this way, SRoCE facilitates secure, efficient offloading of RDMA functions to the packet processing logic in the NIC.

Furthermore, because the NIC is able to identify and steer SRoCE packets on the basis of the UDP 5-tuples in the packet headers, the entire UDP payloads of these packets, including the RDMA headers, can be encrypted. For example, the NIC may store respective cryptographic keys for registered sessions and apply these keys in encrypting and decrypting the packet payloads. Because the entire UDP payload is encrypted, and the session number in the 5-tuple is variable, a malicious party intercepting the packets will not even be able to discern that they contain RDMA traffic.

In the embodiments that are described herein, data communication apparatus, such as a NIC, comprises a network interface for connection to a packet data network and a host interface for connection to a host computer. Packet processing circuitry in the NIC receives from the kernel running on the host CPU, via the host interface, a definition of multiple RDMA sessions and multiple different UDP 5-tuples assigned respectively to the RDMA sessions. Upon receiving a request from an application running on the CPU to send an RDMA message to a peer application over the network using a selected RDMA session (or a group of one, two, or more sessions), the packet processing circuitry transmits, via the network interface, one or more data packets using the UDP 5-tuple that is assigned to the RDMA session.

Similarly, upon receiving an incoming UDP/IP packet from the network, the packet processing circuitry parses the packet header to identify the UDP 5-tuple and thus recognizes that the packet belongs to a session carrying RDMA traffic. Based on the encapsulated RDMA headers in the packets, the packet processing circuitry decapsulates and delivers the RDMA payload of the incoming packet to the application work queue to which it is assigned. Typically, before delivering the RDMA payload, the packet processing circuitry first parses the RDMA header to verify that the session is indeed assigned to the work queue that is identified in the RDMA header, thus ensuring that user applications are able to transmit and receive SRoCE traffic only on the sessions that the kernel has assigned to them.

System Description

FIG. 1 is a block diagram that schematically illustrates a network data communication system 20, in accordance with an embodiment of the invention. System 20 comprises compute nodes 22, 24, 26, . . . , which are connected to communicate over an IP network 28. Each compute node in the pictured example comprises a host computer 30, which is connected to network 28 by a respective NIC 32. Alternatively or additionally, system 20 may comprise other sorts of nodes, such as storage and/or dedicated processing nodes. NICs 32 typically exchange IP packets over network 28 carrying payloads in accordance with various higher-layer protocols, which are identified in the 5-tuples of the packet headers. The present description, however, will focus exclusively on the transmission of SRoCE packets 52, i.e., UDP/IP packets containing session-based RDMA payloads.

Each host computer 30 comprises a central processing unit (CPU) 40 with a host memory 42, typically comprising random-access memory (RAM). CPU 40 and host memory 42 are connected to NIC 32 by a suitable bus 38, such as a PCI Express® (PCIe®) bus. CPU 40 runs an operating system, including a kernel 44, as well as user applications 46. To enable applications 46 to transmit and receive SRoCE packets 52 to and from peer applications on other nodes in system 20, kernel 44 establishes RDMA sessions 48. Kernel 44 assigns sessions 48 to respective queue pairs (QPs) 50, which serve as work queues to queue and deliver RDMA work requests (referred to as work queue elements, or WQEs) from applications 46 to NIC 32.

The process of assigning sessions 48 to QPs 50 is referred to as "binding." Typically, each QP 50 that is to be used in SRoCE communications is bound to a single session 48 or to a group of multiple sessions. For example, multiple sessions may be assigned to a single QP to enable the QP to transmit and/or receive SRoCE packets with multiple different 5-tuples, so that the packet load can be spread over multiple different paths through network 28. By the same token, a single session 48 or a group of sessions may be shared among multiple QPs 50.

The assignments of sessions to QPs 50 are typically stored in the context data of the QPs in memory 42, where they can also be accessed by NIC 32. Additionally or alternatively, the session assignment for each RDMA message can be conveyed to the NIC in the corresponding WQE, i.e., in the work request that contains the details of the RDMA message that the NIC is to send or receive. This latter WQE-based mode of passing session assignments to NIC 32 is particularly useful in the context of Unconnected Datagram (UD) and Dynamically Connected (DC) QPs, in which the same QP can be used by a given application 46 to communicate with multiple different peer applications on other nodes 24, 26, . . . .

Figure 2:
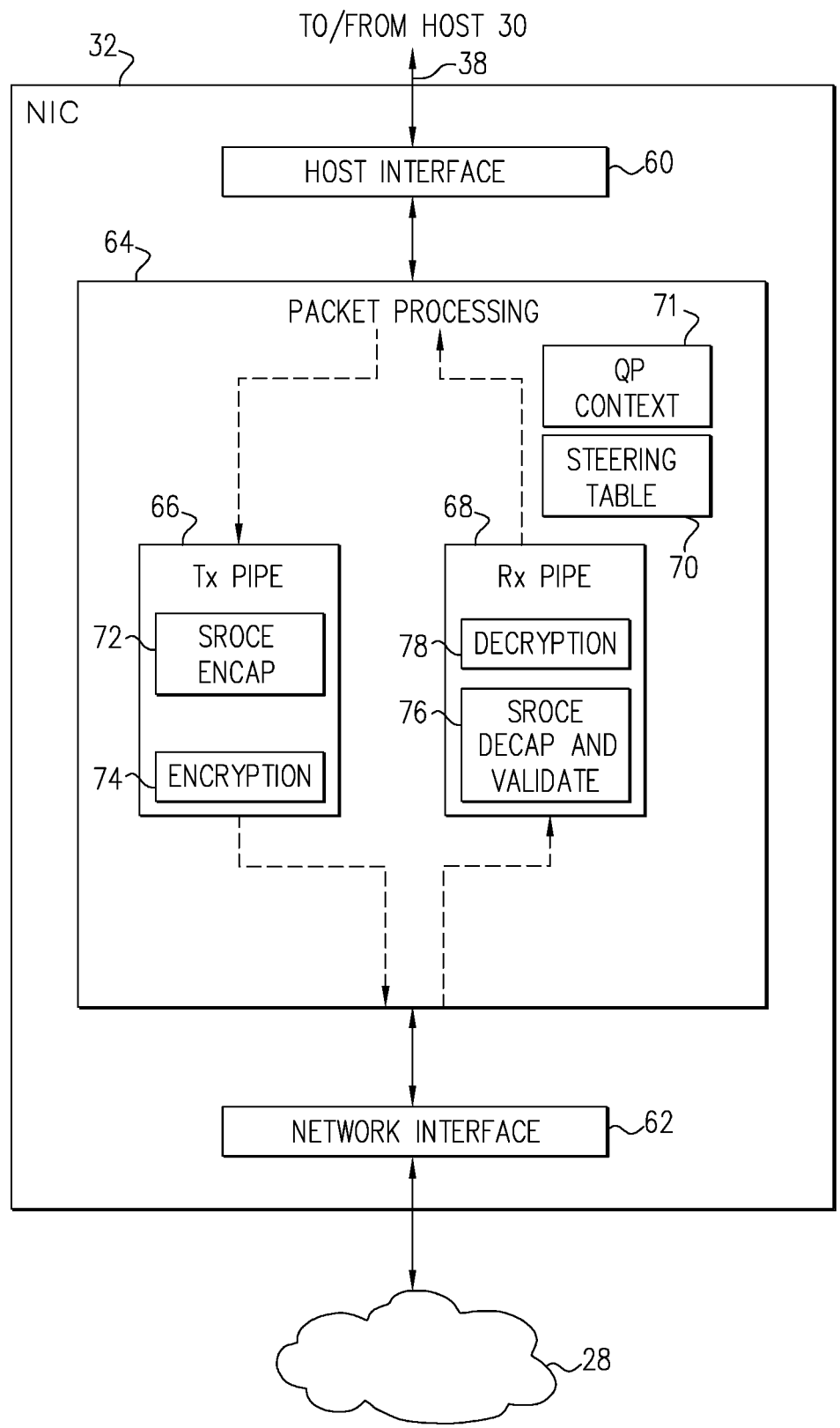
FIG. 2 is a block diagram that schematically illustrates a network interface controller (NIC), in accordance with an embodiment of the invention.

FIG. 2 is a block diagram that schematically shows details of NIC 32, in accordance with an embodiment of the invention. NIC 32 is connected to bus 38 through a host interface 60, comprising a suitable PCIe interface, for example. NIC 32 also comprises a network interface 62, in the form of one or more physical network ports configured for connection to network 28. Interfaces 60 and 62 typically comprise suitable analog and digital hardware circuits, implementing the applicable physical layer and data link standards for communication over bus 38 and network 28.

Packet processing circuitry 64 in NIC 32 is connected between network interface 62 and host interface 60 and comprises both a transmit (Tx) pipe 66, which handles outgoing packets for transmission to network 28, and a receive (Rx) pipe 68, which handles incoming packets received from network 28. The description that follows will focus on the functionality of packet processing circuitry 64 in handling SRoCE traffic. In general, NIC 32 handles packet traffic of other sorts, but these other functions are beyond the scope of the present description.

Packet processing circuitry 64 receives definitions provided by kernel 44 (FIG. 1) of RDMA sessions 48 and the UDP 5-tuples assigned respectively to the RDMA sessions. This session information is stored in a steering table 70, which is typically stored in a memory in NIC 32 and is used by packet processing circuitry 64 in associating sessions (according to the corresponding 5-tuples) with session group IDs and vice versa. The packet processing circuitry also stores a QP table 71 containing context information with respect to QPs 50 that are associated with applications 46 for which NIC 32 sends and receives RDMA messages. QP table 71 indicates, inter alia, the SRoCE session or session group that is assigned to each of the QPs.

Tx pipe 68 receives requests, in the form of WQEs posted to QPs 50, from applications 46 running on CPU 40 to send RDMA messages to peer application over network 28. The SRoCE session (or session group) to use for each message is specified by QP table 71 or by the WQE itself. In response to the WQE, Tx pipe 66 generates an RDMA payload, containing an RDMA header and possibly containing data read from memory 42. SRoCE encapsulation logic 72 encapsulates the RDMA payload in one or more IP packets having an IP header containing the UDP 5-tuple that is assigned to the SRoCE session. Encryption logic 74 in Tx pipe 66 may also encrypt the RDMA payloads (including both headers and data) of the outgoing packets in a given session, using cryptographic keys that are stored by packet processing circuitry for each of the session.

Upon receiving an incoming IP packet from network 28, SRoCE decapsulation and validation logic 76 in Rx pipe 68 parses the packet header to extract the 5-tuple. Logic 76 looks up the 5-tuple in steering table 70 and thus identifies UDP 5-tuples of RDMA sessions and extracts the number of the session to which the UDP 5-tuple is assigned. If the session uses encrypted payloads, decryption logic 78 uses the cryptographic key stored by packet processing circuitry 64 for this session to decrypt the payload. Logic 76 then decapsulates and validates the RDMA payload, to verify that it belongs to a QP 50 that is bound to the session indicated by the UDP 5-tuple, and delivers the RDMA payload to the appropriate application 46 by writing the payload to a buffer that is assigned to the QP in memory 42.

For the sake of clarity, the physical components of NIC 32 are shown in FIG. 2 as multiple, separate functional blocks. In practice, however, these components are typically (although not necessarily) implemented as hardware and firmware components within a single integrated circuit chip or chipset, possibly together with CPU 40, as well. Packet processing circuitry 64 typically comprises hardware logic circuits, which may be programmable or hard-wired and are configured to carry out the functions described herein, as well as other packet processing functions that are known in the art. Additionally or alternatively, at least some of these functions can be carried out by an embedded processor in NIC 32 under the control of software or firmware.

Although FIG. 2 shows one possible implementation of NIC 32, other implementations will be apparent to those skilled in the art after reading the present description and are considered to be within the scope of the present invention.

FIG. 3 is a block diagram that schematically illustrates the structure of one of SRoCE packets 52, in accordance with an embodiment of the invention. As explained earlier, packet 52 has the form of a standard UDP/IP packet, including an Ethernet header 80, an IP header 82, and a UDP header 90. IP header 82 includes a destination IP address (DIP) 84, a source IP address (SIP) 86, and a protocol number 88, which is set to the value for UDP. UDP header 90 contains a source port (SP) 92 and a destination port (DP) 94. The 5-tuple made up of these five fields identifies the RDMA session to which packet 52 belongs.

Typically, the 5-tuples assigned to different RDMA sessions that are registered at a given network node will have different, respective source ports 92. The assigned port number will appear as the source port in outgoing packets and as the destination port in incoming packets on the same session. All sessions will typically share the same source IP address 88, although if NIC 32 presents the RDMA application with multiple interfaces with different IP addresses, the sessions may be divided among these interfaces and have different source IP addresses accordingly.

Packet 52 contains an RDMA payload 98, which includes an RDMA header, including at least a base transport header (BTH) 100, and a data payload 102. If RDMA payload 98 is encrypted, it is typically preceded by a datagram transport layer security (DTLS) header 96. In this case, both BTH 100 and data payload 102 are encrypted using the cryptographic key assigned to this DTLS session. BTH 100 is similar in form to the BTH that is used in RoCEv2 and includes the QP number and RDMA packet sequence number, among other data.

Packet 52 ends with a standard footer 104, containing one or more error detection codes as mandated by the applicable standards.

FIGS. 4A and 4B are block diagrams that schematically show details of steering table 70 and QP table 71, which are used by NIC 64 in processing SRoCE data packets, in accordance with an embodiment of the invention. Tables 70 and 71 are typically stored in a local memory of packet processing circuitry 64. Alternatively or additionally, some or all of the information in these tables can be stored in host memory 42. FIG. 4 shows only a small part of the information in tables 70 and 71, as an aid to understanding aspects of the implementation of the SRoCE protocol. In practice, these tables typically contain substantial additional information relating to packet steering and QP context, including steering of packets that are not associated with SRoCE sessions.

Steering table 70 contains records 110 of RDMA sessions that have been registered in NIC 32 by kernel 44 (FIG. 1). Each record contains a UDP 5-tuple 112 and a corresponding session group number 114 to which the 5-tuple is assigned. For sessions that are configured to use encrypted payloads 98, the corresponding record 110 may also hold a cryptographic state 115, including, inter alia, the cryptographic key to be used in this session. This key may be chosen by kernel 44, for example, by negotiation with the kernel of the peer node in the SRoCE session using a standard DTLS handshaking procedure via UDP/IP packets. Kernel 44 passes the key and other associated cryptographic state information to NIC 32, which stores the key in table 70 and accesses it as need to encrypt payloads 98 of outgoing packets and decrypt payloads 98 of incoming packets.

QP table 71 contains records of QPs that have been opened by applications 46 (FIG. 1) for purposes of exchanging RDMA messages with peer applications. Each record contains a QP number 116 and a listing of a session group 118 to which kernel 44 has bound this QP number. Each session group 118 may contain a single SRoCE session (identified by a single 5-tuple) or multiple sessions (with different corresponding 5-tuples). A QP that is bound to a group of two or more sessions may thus transmit packets with two or more different 5-tuples that reach the same destination, and these packets may consequently be routed over different paths through network 28. This feature can be beneficial is reducing network congestion when a given QP transmits flows with high bandwidth.

Setting Up and Using Rdma Sessions

Figure 5B:
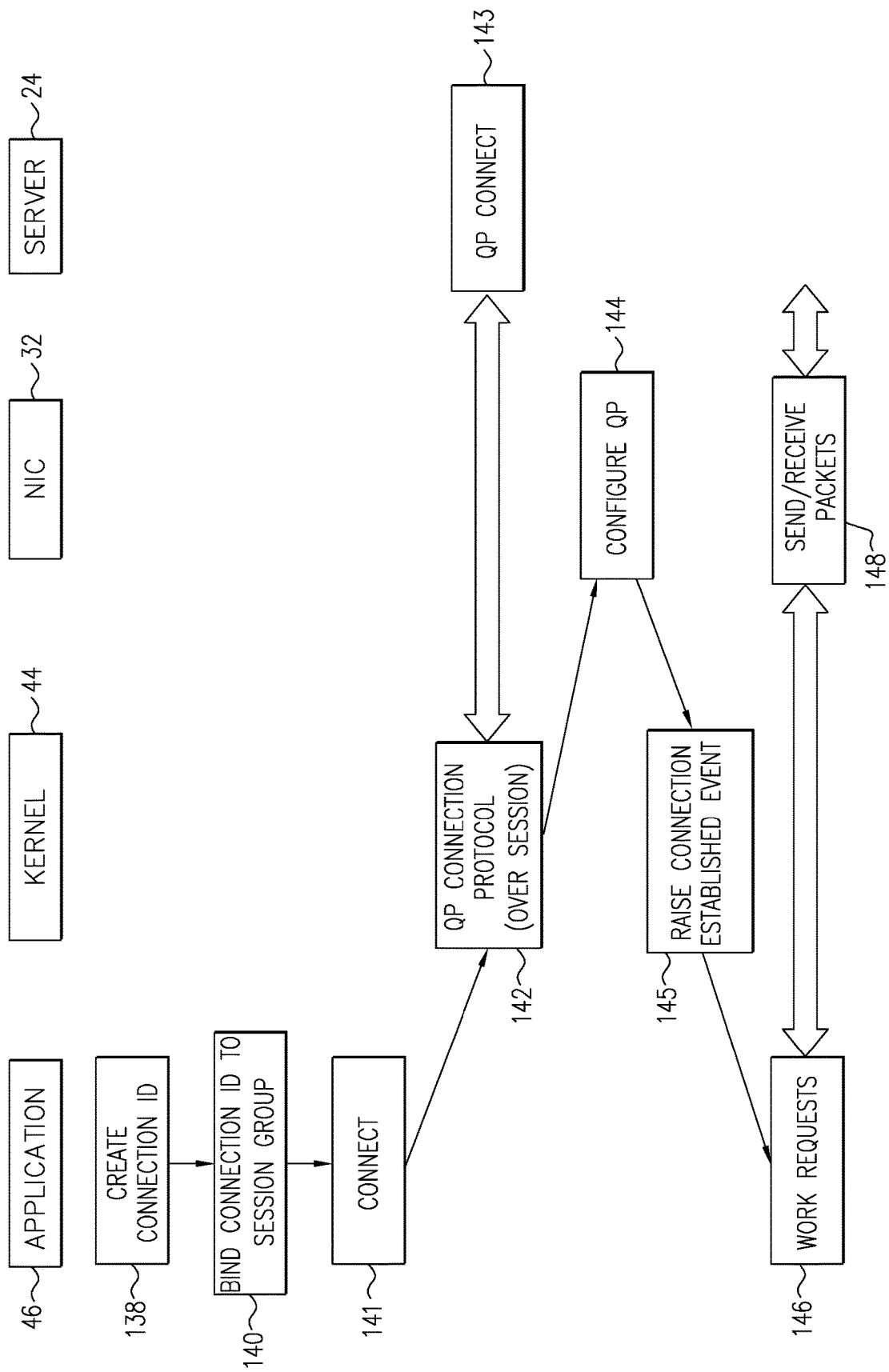

FIGS. 5A and 5B are a flow chart that schematically illustrates a method for setting up an RDMA session, in accordance with an embodiment of the invention. The method is described, for the sake of convenience and clarity, with reference to the elements of system 20 (FIG. 1), with node 22 acting as a client, or initiator, to establish an RDMA session with a server at node 24 as the responder. Specifically FIGS. 5A and 5B show the respective roles of an application 46 and kernel 44 running on host computer 30 and of the packet processing circuitry in NIC 32 of node 22. This particular implementation, however, is shown by way of example; and alternative methods for establishing RDMA sessions and binding the sessions to application work queues will be apparent to those skilled in the art after reading the present description and are considered to be within the scope of the present invention.

To initiate the RDMA session, application 46 submits a request to kernel 44 to create a UDP socket, at a socket request step 120. In response to this request, the kernel assigns a UDP socket, including a unique source port number, and returns a corresponding file-descriptor (FD) of the socket to the application, at a socket assignment step 122. (The FD is a handle to the kernel socket object, since user applications are not permitted to access the socket directly.)

In preparation for establishing an RDMA connection with a remote peer, application 46 submits a further request to kernel 44 to create an RDMA session, at a session request step 124. This request includes the socket FD that the application received previously. Kernel 44 creates a session, extracts the source port number associated with the FD, and associates it with the created session, at a session creation step 126.

Application 46 initiates an RDMA connection with a remote peer, at a connection request step 128. For this purpose, application 46 submits the destination IP address and destination port of the peer application to kernel 44. Kernel 44 initiates an RDMA connection protocol using the resulting UDP 5-tuple, at a session connection step 130. This 5-tuple includes the local IP interface as the source IP address; the source port indicated by the socket FD; the destination IP address of the server (node 24); the destination port of the application on the server; and the UDP protocol number. In response to the RDMA connection protocol, the server accepts the connection and associates it with a session of its own, at a session acceptance step 132.

Kernel 44 registers the session in NIC 32, which saves the 5-tuple and the session group ID in steering table 70 (FIG. 4A), at a session registration step 134. When registration is successfully completed, kernel 44 raises a "session established" event, at a session establishment step 136.

To initiate RDMA communications, application 46 creates a QP 50, along with an RDMA connection ID representing the QP. Application 46 binds the QP with a session group (which may include a single session or multiple sessions) by associating the corresponding connection ID with a session group ID that it received from kernel 44, at a binding step 140. Application 46 instructs the kernel to establish the connection, at a connection request step 141. In response to this instruction, kernel 44 initiates a QP connection protocol with the server, at a connection establishment step 142. The connection establishment messages are sent over the session that has been bound to the connection ID, i.e., in packets containing the designate 5-tuple in their headers. The server accepts the connection in accordance with the protocol, at a connection acceptance step 143.

Kernel 44 then configures QP context table 71 in NIC 32 with the corresponding session 5-tuple, at a QP configuration step 144. When the configuration is successfully completed, kernel 44 raises a "connection established" event, at a connection establishment step 145.

Application 46 can now use the SRoCE session to exchange data over network 28 with the server (node 24).

For this purpose, application 46 submits work requests, which are queued as WQEs 142 for execution by NIC 32, at a work request submission step 146. Upon receiving one of WQEs 142, packet processing circuitry 64 checks QP context table 71 to identify the RDMA session that is bound to this QP. NIC 32 will then send and receive RDMA messages on this QP in data packets having the appropriate UDP 5-tuple in IP header 82, at a packet communication step 148.

Figure 6:
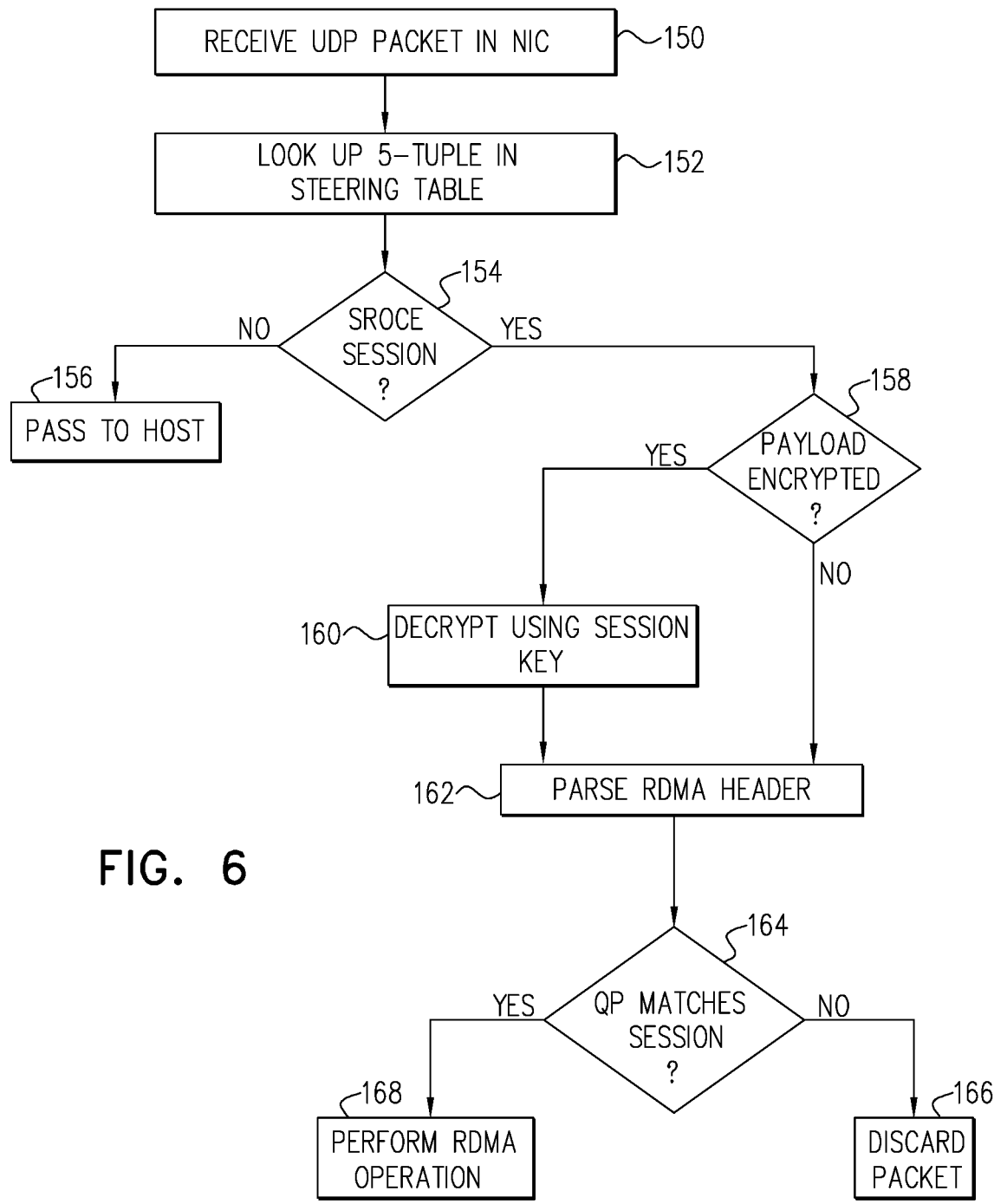
FIG. 6 is a flow chart that schematically illustrates a method for processing packets received by a NIC, in accordance with an embodiment of the invention.

FIG. 6 is a flow chart that schematically illustrates a method for processing IP packets received by NIC 32 from network 28, in accordance with an embodiment of the invention. As part of this method, Rx pipe 68 (FIG. 2) identifies the UDP 5-tuples in headers of incoming IP packets and finds the RDMA sessions with which the UDP 5-tuples are associated. On this basis, the Rx pipe decapsulates and delivers the RDMA messages contained in the incoming packets to the applications to which the sessions are assigned. Specifically, SRoCE decapsulation and validation logic 76 in Rx pipe 68 will deliver RDMA instructions and data to a given application only after verifying that the session with which the 5-tuple is associate is bound to a QP 50 that is assigned to the application.

The method of FIG. 6 is initiated when NIC 32 receives a UDP/IP packet from network 28, at a packet reception step 150. Rx pipe 68 parses the packet header to extract the 5-tuple and looks up the 5-tuple in steering table 70, at a 5-tuple lookup step 152. The steering table indicates whether this 5-tuple is assigned to an SRoCE session, at a session checking step 154. If so, Rx pipe 68 reads the session number from table 70. If not, Rx pipe 68 passes the packet to host computer 30 for further processing, for example processing by the UDP stack in kernel 44, at a host processing step 156.

Upon identifying the incoming packet at step 154 as belonging to an SRoCE session, Rx pipe 68 checks whether payload 98 of the packet is encrypted, at an encryption checking step 158. If so, decryption logic 78 fetches cryptographic key 115 for this session from the corresponding record 110 in steering table 70, and applies the key in decrypting payload 98, at a decryption step 160. (Rx pipe 68 skips step 160 if the payload is not encrypted.) Decapsulation and validation logic 76 now parses the RDMA header (BTH 100 in FIG. 4) and extracts the destination QP number, at a header parsing step 162. Logic 76 checks QP context table 71 to verify that the destination QP number is bound to the session number that was extracted at step 154. If so, Rx pipe 68 proceeds to execute the RDMA operation invoked by the packet, at an RDMA execution step 168. For example, logic 76 may decapsulate RDMA payload 102 and deliver the payload data to the appropriate application 46 by writing the data to a designated buffer in host memory 42. Otherwise, logic 76 invalidates and discards the packet, at a packet discard step 166.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for data communication, comprising:
   a network interface for connection to a packet data network;
   a host interface for connection to a host computer, which includes a central processing unit (CPU) and a host memory; and
   packet processing circuitry to receive, via the host interface, from a kernel running on the CPU, associations between multiple remote direct memory access (RDMA) sessions and multiple different User Datagram Protocol (UDP) 5-tuples, which comprise different, respective UDP source ports and are assigned respectively to the RDMA sessions, and to receive from an application running on the CPU a request to send an RDMA message, using a selected group of one or more of the RDMA sessions, to a peer application over the packet data network, and in response to the request, to transmit to a destination node, via the network interface, one or more Internet Protocol (IP) data packets encapsulating respective RDMA payloads and having an IP header containing a selected one of the UDP 5-tuples that is assigned to one of the RDMA sessions in the selected group,
   wherein a UDP source port field in the IP header contains a respective port number that is assigned to the one of the RDMA sessions in the selected group, and
   wherein upon receiving an incoming IP packet from the packet data network, the packet processing circuitry identifies a UDP 5-tuple in a header of the incoming IP packet, recognizes an RDMA session to which the UDP 5-tuple in the header is assigned, wherein the UDP 5-tuple in the header includes the assigned port number that is inserted by the destination node in a UDP destination port field of the received incoming IP packet.

2. The apparatus according to claim 1, wherein based on the recognized session, the packet processing circuitry decapsulates and delivers an RDMA payload of the incoming IP packet to the application.

3. The apparatus according to claim 2, wherein the kernel assigns different ones of the RDMA sessions to work queues associated with different, respective applications running on the CPU, and wherein the packet processing circuitry delivers the RDMA payload to the application only after verifying that the recognized session is assigned to a work queue that is assigned to the application.

4. The apparatus according to claim 1, wherein in response to instructions conveyed by the kernel, the packet processing circuitry stores assignments of different ones of the RDMA sessions to different, respective applications running on the CPU.

5. The apparatus according to claim 4, wherein the packet processing circuitry stores an assignment of a group of two or more of the RDMA sessions to a single one of the applications.

6. The apparatus according to claim 4, wherein the application enters the request to send the RDMA message in a work queue that is assigned to the application, and the work queue is bound by the kernel to an RDMA session that is assigned to the application, and wherein the packet processing circuitry stores records of the RDMA sessions and the work queues that are respectively bound to the RDMA sessions, and applies the records in validating RDMA messages from and to the application.

7. The apparatus according to claim 1, wherein the packet processing circuitry stores respective cryptographic keys for one or more of the RDMA sessions, and applies the respective cryptographic keys in encrypting and decrypting RDMA payloads of data packets that are transmitted to and received from the packet data network in the one or more of the RDMA sessions.

8. A method for data communication, comprising:
coupling a network interface controller (NIC) between a packet data network and a host computer, which includes a central processing unit (CPU) and a host memory;
receiving in the NIC, from a kernel running on the CPU, a definition of multiple remote direct memory access (RDMA) sessions and multiple different User Datagram Protocol (UDP) 5-tuples, which comprise different, respective UDP source ports and which are assigned respectively to the RDMA sessions;
receiving in the NIC, from an application running on the CPU, a request to send an RDMA message, using a selected group of one or more of the RDMA sessions, to a peer application over the packet data network;
in response to the request, transmitting from the NIC to a destination node, via the packet data network, one or more Internet Protocol (IP) data packets encapsulating respective RDMA payloads and having an IP header containing a selected one of the UDP 5-tuples that is assigned to one of the RDMA sessions in the selected group,
wherein a UDP source port field in the IP header contains a respective port number that is assigned to the one of the RDMA sessions in the selected group;
receiving in the NIC an incoming IP packet from the packet data network;
identifying, by the NIC, a UDP 5-tuple in a header of the incoming IP packet; and
recognizing an RDMA session to which the UDP 5-tuple in the header is assigned,
wherein the UDP 5-tuple in the header includes the assigned port number that is inserted by the destination node in a UDP destination port field of the received incoming IP packet.

9. The method according to claim 8, and comprising: based on the recognized session, decapsulating and delivering an RDMA payload of the incoming IP packet to the application.

10. The method according to claim 9, and comprising receiving in the NIC, from the kernel, assignments of different ones of the RDMA sessions to work queues associated with different, respective applications running on the CPU, wherein delivering the RDMA payload comprises passing the RDMA payload to the application only after verifying that the recognized session is assigned to a work queue that is assigned to the application.

11. The method according to claim 8, and comprising assigning, by the kernel, different ones of the RDMA sessions to different, respective applications running on the CPU.

12. The method according to claim 11, wherein assigning the different ones of the RDMA sessions comprises assigning a group of two or more of the RDMA sessions to a single one of the applications.

13. The method according to claim 11, wherein receiving the request comprises queueing a work request to send the RDMA message in a work queue that is assigned to the application, wherein the work queue is bound by the kernel to an RDMA session that is assigned to the application, and wherein the NIC stores records of the RDMA sessions and the work queues that are respectively bound to the RDMA sessions, and applies the records in validating RDMA messages from and to the application.

14. The method according to claim 10, and comprising storing in the NIC respective cryptographic keys for one or more of the RDMA sessions, and applying the respective cryptographic keys in encrypting and decrypting RDMA payloads of data packets that are transmitted to and received from the packet data network in the one or more of the RDMA sessions.

15. A system for data communication, comprising:
a host memory;
a central processing unit (CPU), which is to run a kernel, which defines multiple remote direct memory access (RDMA) sessions and respectively assigns multiple different User Datagram Protocol (UDP) 5-tuples, which comprise different, respective UDP source ports, to the RDMA sessions, and an application, which generates a request to send an RDMA message, using a selected group of one or more of the RDMA sessions, to a peer application over a packet data network; and
a network interface controller (NIC), which is to transmit to a destination node, in response to the request, via the packet data network, one or more Internet Protocol (IP) data packets encapsulating respective RDMA payloads and having an IP header containing a selected one of the UDP 5-tuples that is assigned to one of the RDMA sessions in the selected group,
wherein a UDP source port field in the IP header contains a respective port number that is assigned to the one of the RDMA sessions in the selected group, and
wherein upon receiving an incoming IP packet from the packet data network, the NIC identifies a UDP 5-tuple in a header of the incoming IP packet, recognizes an RDMA session to which the UDP 5-tuple in the header is assigned, wherein the UDP 5-tuple in the header includes the assigned port number that is inserted by the destination node in a UDP destination port field of the received incoming IP packet.

16. The system according to claim 15, wherein based on the recognized session, the NIC decapsulates and delivers an RDMA payload of the incoming IP packet to the application.

17. The system according to claim 16, wherein the kernel assigns different ones of the RDMA sessions to work queues associated with different, respective applications running on the CPU, and wherein the NIC delivers the RDMA payload to the application only after verifying that the recognized session is assigned to a work queue that is assigned to the application.

18. The system according to claim 15, wherein in response to instructions conveyed by the kernel, the NIC stores assignments of different ones of the RDMA sessions to different, respective applications running on the CPU.

19. The system according to claim 18, wherein the application enters the request to send the RDMA message in a work queue that is assigned to the application, and the work queue is bound by the kernel to an RDMA session that is assigned to the application, and wherein the NIC stores records of the RDMA sessions and the work queues that are respectively bound to the RDMA sessions, and applies the records in validating RDMA messages from and to the application.

20. The system according to claim 15, wherein the NIC stores respective cryptographic keys for one or more of the RDMA sessions, and applies the respective cryptographic keys in encrypting and decrypting RDMA payloads of [the] data packets that are transmitted to and received from the packet data network in the one or more of the RDMA sessions.

* * * * *